R. N. HUDSON & E. C. BRICE.
APPARATUS FOR GENERATING ELECTRICITY BY CHEMICAL MEANS.
APPLICATION FILED OCT. 28, 1909.
1,001,406.
Patented Aug. 22, 1911.
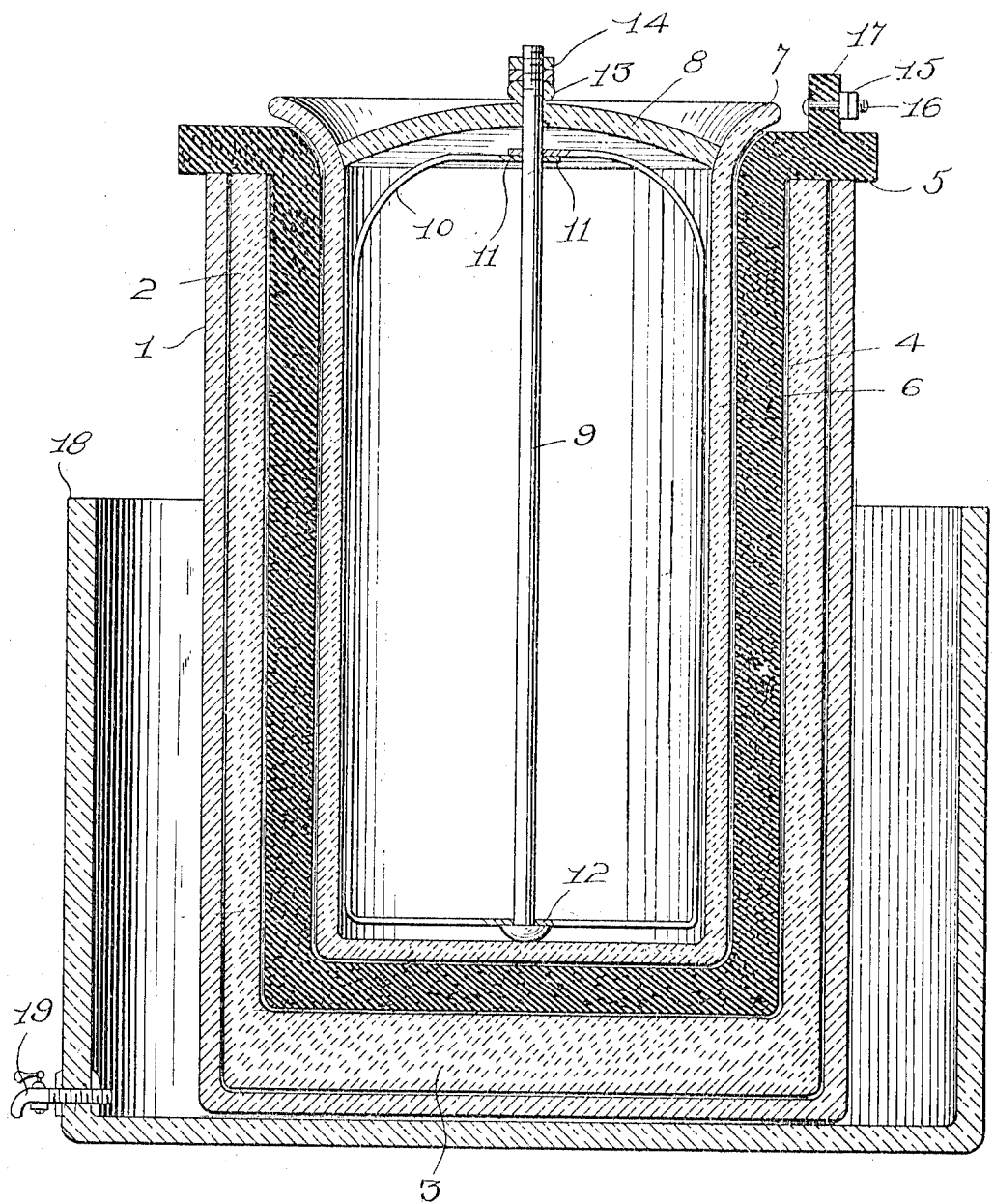
Witnesses
Inventor
Richard N. Hudson,
Edward C. Brice.
By E. S. Freeman,
Attorney.

UNITED STATES PATENT OFFICE.

RICHARD N. HUDSON AND EDWARD C. BRICE, OF LEXINGTON, KENTUCKY.

APPARATUS FOR GENERATING ELECTRICITY BY CHEMICAL MEANS.

1,001,406.

Specification of Letters Patent.

Patented Aug. 22, 1911.

Application filed October 28, 1909. Serial No. 525,224.

*To all whom it may concern:*

Be it known that we, RICHARD N. HUDSON and EDWARD C. BRICE, citizens of the United States of America, residing at Lexington, in the county of Fayette and State of Kentucky, have invented certain new and useful Improvements in Apparatus for Generating Electricity by Chemical Means, of which the following is a specification, reference being had therein to the accompanying drawing.

This invention relates to an apparatus for generating electricity, and has for its object to provide a new and improved apparatus of this kind by means of which greater efficiency is obtained as well as economy.

Another object of the invention is to provide an apparatus for generating electricity chemically by means of which chemical action is increased and greater electric output is obtained both in voltage and amperage.

Another object of the invention is to produce an apparatus for generating electricity chemically, in which the action of the apparatus is prolonged with a small loss of active material.

Another object of the invention is to reduce the electrical resistance and thereby increase the efficiency.

The apparatus hereinafter set forth is to be employed for electric light and power.

These and other objects of the invention will appear in the course of the following specification.

Referring to the accompanying drawing, the illustration shows, in vertical section, an apparatus constructed in accordance with this invention.

In carrying out the invention, there is employed a cell jar 1, made of vitreous material, in which is located an outer porous cup 2 having a thick bottom 3. This outer porous cup serves as a storage place for a qunatity of the electrolyte to act upon the carbon and also to hold the carbon centrally of the cell. By reason of the thickened bottom additional storage for the electrolyte is provided. In said porous cup is located a carbon conductor 4, which is in the shape of a cup, having at its upper end a flange 5 resting on the jar 1 and the outer porous cup 2 and supported thereby. Located within the carbon conductor 4 is a thin, inner porous cup 6 having an outwardly flaring upper end 7 in which is tightly seated a removable cover 8. Within the inner porous cup 6 is located an alloyed pencil 9 which extends through the lower end of an alloyed tie member 10 and through the upper overlapping ends 11 of said tie 10 and through the cover 8. The lower end of the pencil 9 is formed with the button 12 which serves to keep it in place and also holds tie member 10 in an elevated position on its lower end. The upper end of the pencil 9 is provided with a clamp nut 13 to hold the cover 8 in position thereon. Besides the clamp nut 13 is a pair of binding nuts 14 on the pencil 9 for attaching a lead wire. Another lead wire is connected with the carbon conductor 4 by means of clamp nuts 15 on a bolt 16 engaging a lug 17 on the flange 5 and the carbon conductor 4. The cell just described is set in a saucer 18 somewhat wider than the cell and adapted to contain water which may be drawn off by means of a faucet 19.

In carrying out the invention, there is employed with the apparatus described, a new composition of matter that is placed in the inner porous cup 6, and consists of zinc, mercury and hydrochloric acid, which is a crystalline metallic mass the color of silver, brittle and capable of being reduced to a fine powder.

The new composition of matter is produced as follows: Take eight parts of sheet zinc or sheet iron and reduce the same to small fragments. To this is added one part of metallic mercury and one part of muriatic acid. The whole is then mixed until a chemical union is formed between the zinc, mercury, and chlorin, of the muriatic acid. The liquid resulting from the reaction is drawn off leaving an amalgam that is the color of silver, brittle, and easily pulverized between the fingers or ground into powder in an ordinary mill.

In practice a small amount of acid (the amount being stated in the specification) is used to start the action, generating heat, causing the mercury to rise in vapor, and coating the zinc fragments, this action is allowed to continue until vapor ceases to rise. The mass is then stirred until the metals have become bright, the fluid chlorid of zinc, $ZnCl_2$, is then poured off. This stirring is necessary to brighten the metals.

In setting up the cell, the outer porous cup 2 and the carbon conductor 4 are placed in a bath composed of equal parts of muriatic and nitric acid and are left at rest until the cup 2 and the carbon conductor 4 have absorbed all the acid they will take up, which is about thirty per cent of their weight. The outer porous cup 2 and the carbon conductor 4 are then placed in the jar 1. A solution of muriatic and nitric acid sufficiently mixed is placed in the cell to fill up the slight space intervening between the walls and the several parts. The inner porous cup 6 is then charged as follows: The tie member 10 is threaded on the pencil 9 and it is then placed in the porous cup 6.

The new composition of matter in fragmentary form, is placed in the porous cup 6 about the pencil and the tie member 10, the porous cup 6 being filled and packed tight to the top of the tie member 10. The interstices between the metallic fragments in the porous cup 6 are then filled with hot water. The top 8 is then placed on the pencil 9 and a nut 13 screwed down on the cover 8, thereby forcing the cover against the sides of the cup 6 and completely sealing the top of said cup. The thin inner porous cup 6 is then placed in the carbon conductor 4 and the cell is placed in the reservoir or saucer 18, and the whole is filled with hot water. The lead wires being connected to the nuts 15, the cell is ready for use.

The alloyed pencil and tie members are composed of copper, zinc and mercury, the object in using this alloy being to maintain an indestructible conductor in the porous cup 6 (indestructible in the electrolyte used). The functions of the pencil and tie members are to collect the current within the fluid that is generated by the decomposition of the amalgamated zinc fragments and deliver it to the circuit. If amalgamated zinc or zinc alone was used in place of the copper zinc and mercury, the same would be decomposed in a short time by the action of the electrolyte and the conducting power would be reduced and in time destroyed.

When the cell is set up and the circuit closed, the reaction that will take place in the cell is as follows: The heat from the hot water in the reservoir 18 penetrates the walls of the jar 1, heating the mixed acids; the chlorin is evolved and the conducting power of the carbon 4 is greatly increased. The heat is further transmitted through the several parts, finally reaching the inner porous cup and the alloyed metal contained therein. Chemical action is intensified, chlorin is evolved, and a weak solution of chlorid of zinc is formed. From the evolution of the chlorin, a remarkable intensity of current is produced. This intense power can be maintained as long as the inner porous cup 6 is full and the heat is applied, at least one hour in the twenty-four. At the end of the twenty-four hours, the faucet 19 is opened and the cold water is drawn off, and the reservoir again filled with hot water. As the amalgamated fragments are decomposed, the current generated thereby is taken up by the pencil and tie members and delivered to the circuit when closed. The objects and use of the fragments are two-fold; first, greater surfaces are exposed to the electrolyte, and the amalgamated zinc will rest closer against the wall and bottom of the porous cup, bringing the metal and the carbon closer together, thereby reducing the resistance and allowing a free circulation of the fluid.

To renew the cell, the lead wire is taken off the upper end of the pencil, the cover 8 is removed, the porous cup 6 is taken out and the liquid that results from the operation is poured off. Hot water is again added to the cup 6. If the amalgam has become partly exhausted, more of the fragments can be added to fill up the cup 6.

When the new composition of matter is fully decomposed, the metallic mercury, which has at no time been acted upon by the acid used, is collected in a metallic state from the bottom of the porous cup 6 and is used again in forming the new composition of matter.

Of course, it is understood that sheet iron can be used in place of sheet zinc.

It is further understood that heat can be applied by other means than by hot water, provided it is not over two hundred and twelve degrees Fahrenheit; hot water, however, is preferred.

What we claim is:—

1. In an apparatus of the character described, a cell comprising an outer vitreous jar, a porous cup with a thick bottom located in said jar, a carbon cup located in said porous cup, a thin porous cup located in the carbon cup, an alloyed tie member suspended in said thin porous cup, a closely fitting cover seated in the top of the thin porous cup, an alloyed pencil mounted on said tie member, and means for connecting electrical conductors with the pencil and the carbon cup respectively.

2. In an apparatus of the character described, a cell comprising an outer vitreous jar, a porous cup located in said jar, a carbon cup located in said porous cup, a thin porous cup located in the carbon cup, a metallic tie member suspended in said thin porous cup, a closely fitting cover seated in the top of the thin porous cup, a metallic pencil mounted on said tie member, means for connecting electric conductors with the pencil and carbon cup respectively, and an electrolyte held within said cups.

3. In an apparatus of the kind described, a cell comprising an outer vitreous jar, a porous cup located in said jar, a carbon cup located in said porous cup, a thin porous cup located in the carbon cup, a metallic tie member suspended in said thin porous cup, a closely fitting cover seated in the top of the thin porous cup, a metallic pencil mounted on said tie member, means for connecting electric conductors with the pencil and carbon cup respectively, an electrolyte held within said cups, and an additional amount of metal surrounding said pencil.

In testimony whereof we hereunto affix our signatures in presence of two witnesses.

RICHARD N. HUDSON.
EDWARD C. BRICE.

Witnesses:
 JOHN D. NASH,
 SAM H. HENTON.

Copies of this patent may be obtained for five cents each, by addressing the "Commissioner of Patents, Washington, D. C."